(12) United States Patent
Huntley

(10) Patent No.: US 10,528,746 B2
(45) Date of Patent: Jan. 7, 2020

(54) SYSTEM, APPARATUS AND METHOD FOR TRUSTED CHANNEL CREATION USING EXECUTE-ONLY CODE

(71) Applicant: Intel Corporation, Santa Clara, CA (US)

(72) Inventor: Barry E. Huntley, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 403 days.

(21) Appl. No.: 15/390,846

(22) Filed: Dec. 27, 2016

(65) Prior Publication Data
US 2018/0181764 A1 Jun. 28, 2018

(51) Int. Cl.
*G06F 21/60* (2013.01)
*G06F 9/455* (2018.01)

(52) U.S. Cl.
CPC ........ *G06F 21/602* (2013.01); *G06F 9/45558* (2013.01); *G06F 21/606* (2013.01); *G06F 2009/45587* (2013.01)

(58) Field of Classification Search
CPC .. G06F 21/602; G06F 21/606; G06F 9/45558; G06F 2009/45587; G06F 21/62; G06F 21/70
USPC ........................................................ 713/190
See application file for complete search history.

(56) References Cited

U.S. PATENT DOCUMENTS

| | | | | |
|---|---|---|---|---|
| 8,214,629 B2 * | 7/2012 | John | ................... | G06F 12/1408 713/1 |
| 8,646,028 B2 * | 2/2014 | McKenzie | .............. | G06F 21/83 726/1 |
| 8,954,752 B2 * | 2/2015 | Boivie | ................ | G06F 21/6209 380/201 |
| 8,990,582 B2 * | 3/2015 | Maino | ................. | G06F 12/0811 713/190 |
| 9,147,086 B1 * | 9/2015 | Potlapally | ............... | G06F 21/64 |
| 2003/0211842 A1 * | 11/2003 | Kempf | .................. | H04L 9/0825 455/411 |
| 2004/0088536 A1 * | 5/2004 | Lim | .................... | H04L 63/0428 713/151 |
| 2005/0039030 A1 * | 2/2005 | Rodgers | ............. | H04N 21/4424 713/189 |

(Continued)

FOREIGN PATENT DOCUMENTS

WO WO-2017129657 A1 * 8/2017 ......... G06F 9/45558

OTHER PUBLICATIONS

U.S. Appl. No. 14/752,079, filed Jun. 26, 2015, entitled "Protecting Confidential Data with Transactional Processing in Execute-Only Memory," by Michael LeMay.

*Primary Examiner* — Kambiz Zand
*Assistant Examiner* — Mahabub S Ahmed
(74) *Attorney, Agent, or Firm* — Trop, Pruner & Hu, P.C.

(57) ABSTRACT

In one embodiment, an apparatus includes a first virtual machine (VM) including an encryption logic to encrypt first information. The encryption logic may include a first code block stored in a first execute-only region of a memory to encrypt the first information with a first key provisioned by a trusted agent, the first key stored in the first code block. The apparatus may further include a second VM including a decryption logic to decrypt the first information, and a shared buffer to enable secure communication of the encrypted first information from the first VM to the second VM, without involvement of the trusted agent. Other embodiments are described and claimed.

20 Claims, 8 Drawing Sheets

(56) References Cited

U.S. PATENT DOCUMENTS

| | | | | |
|---|---|---|---|---|
| 2007/0198851 | A1* | 8/2007 | Goto | G06F 12/145 713/187 |
| 2008/0244573 | A1* | 10/2008 | Sahita | G06F 9/45558 718/1 |
| 2009/0187697 | A1* | 7/2009 | Serebrin | G06F 9/455 711/6 |
| 2010/0058046 | A1* | 3/2010 | John | G06F 12/1408 713/2 |
| 2011/0126269 | A1* | 5/2011 | Youngworth | G06F 12/109 726/4 |
| 2012/0159184 | A1* | 6/2012 | Johnson | G06F 21/6218 713/189 |
| 2013/0117577 | A1* | 5/2013 | Hars | G06F 12/1408 713/190 |
| 2013/0159726 | A1* | 6/2013 | McKeen | G06F 21/72 713/189 |
| 2013/0191648 | A1* | 7/2013 | Bursell | G06F 9/4856 713/189 |
| 2013/0191830 | A1* | 7/2013 | Mann | G06F 9/54 718/1 |
| 2014/0108649 | A1* | 4/2014 | Barton | G06F 9/45533 709/224 |
| 2014/0108789 | A1* | 4/2014 | Phatak | G06F 21/34 713/156 |
| 2014/0173628 | A1* | 6/2014 | Ramakrishnan Nair | G06F 9/461 718/108 |
| 2014/0189274 | A1* | 7/2014 | Hildesheim | G06F 12/145 711/163 |
| 2014/0373012 | A1* | 12/2014 | Ylitalo | G06F 9/45558 718/1 |
| 2015/0058997 | A1* | 2/2015 | Lee | G06F 9/45558 726/26 |
| 2015/0134965 | A1* | 5/2015 | Morenius | G06F 21/57 713/172 |
| 2015/0278119 | A1* | 10/2015 | Loh | G06F 12/1408 713/193 |
| 2015/0319144 | A1* | 11/2015 | Barton | H04L 63/0428 713/168 |
| 2015/0372854 | A1* | 12/2015 | Furukawa | G06F 9/45558 709/223 |
| 2015/0378633 | A1* | 12/2015 | Sahita | G06F 9/45558 711/163 |
| 2016/0042195 | A1* | 2/2016 | Agarwal | G06F 9/44505 726/17 |
| 2016/0092678 | A1* | 3/2016 | Probert | G06F 9/45558 713/193 |
| 2016/0094571 | A1* | 3/2016 | Sahita | G06F 21/56 726/23 |
| 2016/0149858 | A1* | 5/2016 | Asaithambi | H04L 63/029 726/12 |
| 2016/0292442 | A1* | 10/2016 | Axnix | G06F 21/575 |
| 2016/0364341 | A1* | 12/2016 | Banginwar | G06F 12/145 |
| 2017/0177500 | A1* | 6/2017 | Shanbhogue | G06F 12/0875 |
| 2017/0187694 | A1* | 6/2017 | Friedman | G06F 9/45558 |
| 2018/0060249 | A1* | 3/2018 | Tsirkin | G06F 12/1408 |
| 2018/0145951 | A1* | 5/2018 | Varadarajan | H04W 12/02 |
| 2018/0268130 | A1* | 9/2018 | Ghosh | G06F 21/53 |

\* cited by examiner

SYSTEM, APPARATUS AND METHOD FOR TRUSTED CHANNEL CREATION USING EXECUTE-ONLY CODE

TECHNICAL FIELD

Embodiments relate to secure communications in one or more computing systems.

BACKGROUND

Secure communications between separate entities (e.g., applications, containers, virtual machines (VMs) or so forth) of one or more computing systems can be complex and performance intensive. For example, a trusted third party entity such as an operating system, virtual machine monitor or other entity is typically responsible for enabling secure communication. Additional overhead impact results as this trusted entity is also responsible for intermediating actual secure communications between these separate entities, by directly assisting in the communication between the entities. This impact can have negative implications in time-sensitive communications, and often requires an undesirable tradeoff between security and performance (e.g., latency and/or throughput).

DETAILED DESCRIPTION

In various embodiments, techniques are provided to enable secure communications between communicating entities of one or more computing systems in a simpler more performant manner, at least in part by taking advantage of the properties of execute-only (XO) code execution. More specifically, in embodiments the properties of execute-only code may be leveraged to provision one or more secrets to enable creation and use of a lightweight trusted communication channel between two entities. The main property of execute-only code is to ensure that the secret can be used without being discoverable (since the code is not readable) with a minimal overhead cost. This approach, while still using a trusted third party agent for provisioning/setup of the secure channel, allows for a much more streamlined runtime approach that does not involve continual intervention with the trusted agent. This approach is also much lighter weight than a trusted execution environment (TEE)-based approach, as the costs of entering/exiting the TEE can be very high. Embodiments may be used in a variety of system contexts for different use cases. One particular embodiment may be used to perform packet processing for network function virtualization usages. Another use cases may be for protecting secure sockets layer keys.

In different implementations, different manners of establishing and enforcing protections for execute-only code regions can vary. As one particular example, page table mechanisms can be used to isolate page-based execute-only regions and control access to the same. Of course other techniques to control entry points, interrupts, and/or other accesses within such regions may be used. Still further embodiments may use transactional-based methods to prevent entry to arbitrary addresses within a block. Also a secret may be provisioned by way of such XO regions.

Figure 1:
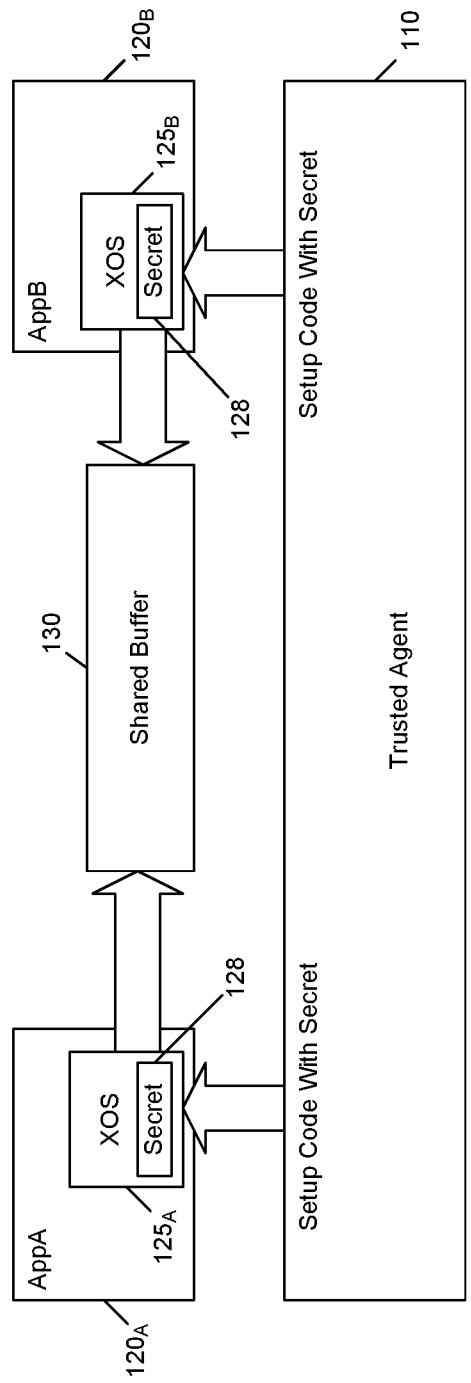
FIG. 1 is a block diagram of a system in accordance with an embodiment of the present invention.

Referring now to FIG. 1, shown is a block diagram of a system in accordance with an embodiment of the present invention. System 100 may be any type of computing system, ranging from a small portable device such as a smartphone, tablet or so forth, to a larger computer such as a desktop computer, server computer or so forth.

In the embodiment of FIG. 1, a trusted third party agent is present. Specifically, trusted agent 110 may be a given system software of computing system 100, for example, an operating system (OS), virtual machine monitor (VMM), hypervisor or so forth. In embodiments, trusted agent 110 may be used to provision a code block within applications seeking to communicate securely with each other. After such initialization with these code blocks provisioned to the different applications, no further interaction or intermediation with trusted agent 110 is needed in order to allow trusted communication via a secure channel created between the applications.

More particularly in the embodiment of FIG. 1, a first application $120_A$ may seek to communicate with a second application $120_B$. As an example, application $120_A$ may be any type of data processing application that generates information that is to be consumed by application $120_B$. In order to provide for trusted communication of this information between applications 120 (generically), a shared memory region 130, which in an embodiment may be implemented as a shared buffer, is provided. Note that shared memory region 130 may be a dedicated and trusted memory region within a system memory such as a dynamic random access memory (DRAM) or other system memory. To provide communication of information between applications 120, a writing application (e.g., application $120_A$) may write the information in shared memory region 130 and then notify a consumer application (e.g., application $120_B$) by a given notification mechanism, e.g., via a notification message or in another manner. Responsive to this notification, second application $120_B$ may access the information at the indicated location within shared memory region 130.

To provide this secure communication channel, both applications may be provisioned with a corresponding code block $125_A$-$125_B$. More specifically these code blocks may be modified or additional instrumented code added into the given application via trusted agent 110. In addition to code to enable encryption/decryption operations, code blocks 125 may further include at least one shared secret, such as a symmetric key that is thus provisioned into both applications 120 to enable encryption/decryption operations using such key. As one example, the symmetric key may be an Advanced Encryption Standard (AES)-based symmetric key.

As will be described further below, in one embodiment, secret 128 may be embedded within an instruction as part of an execute-only region of code. By using secret 128, application $120_A$ and $120_B$ may securely communicate with each other without involvement of trusted agent 110 to manage communications directly. Depending on the required security attributes, the type of secret can vary. For example, if the desire is for a simple low security buffer, secret 128 may take the form of the address of shared buffer 130. For higher security, secret 128 may be formed using any one of a number of cryptographic methods to ensure the confidentiality and/or integrity of the data.

In addition, a Trusted Computing Base (TCB) around the secret may also vary in different implementations. For example, if the VMM is provisioning the secret into the application directly, the OS is generally removed from the TCB, as hardware control techniques may be configured such that the OS is unable to read the secret out of the memory. In embodiments, the VMM or other trusted agent may be configured to assert other runtime controls to maintain the secret. For instance, the VMM may be configured to restrict the OS from single stepping through this region of code, taking interrupts, etc., so as not to expose the secret.

Note that this provisioning of a secret can be from a trusted entity (such as a VMM or OS) directly into a virtual machine (VM) or other OS-created container's code region. Using an embodiment, the TCB of the secret can exclude intermediary entities such as the OS in the case where additional privileges are applied. For example, if a VMM uses paging mechanisms to make a code region execute-only, the operating system can no longer directly access the secret since it does not have access to the memory. Understand while shown at this high level in the embodiment of FIG. 1, of course many variations and alternatives are possible.

Figure 2:
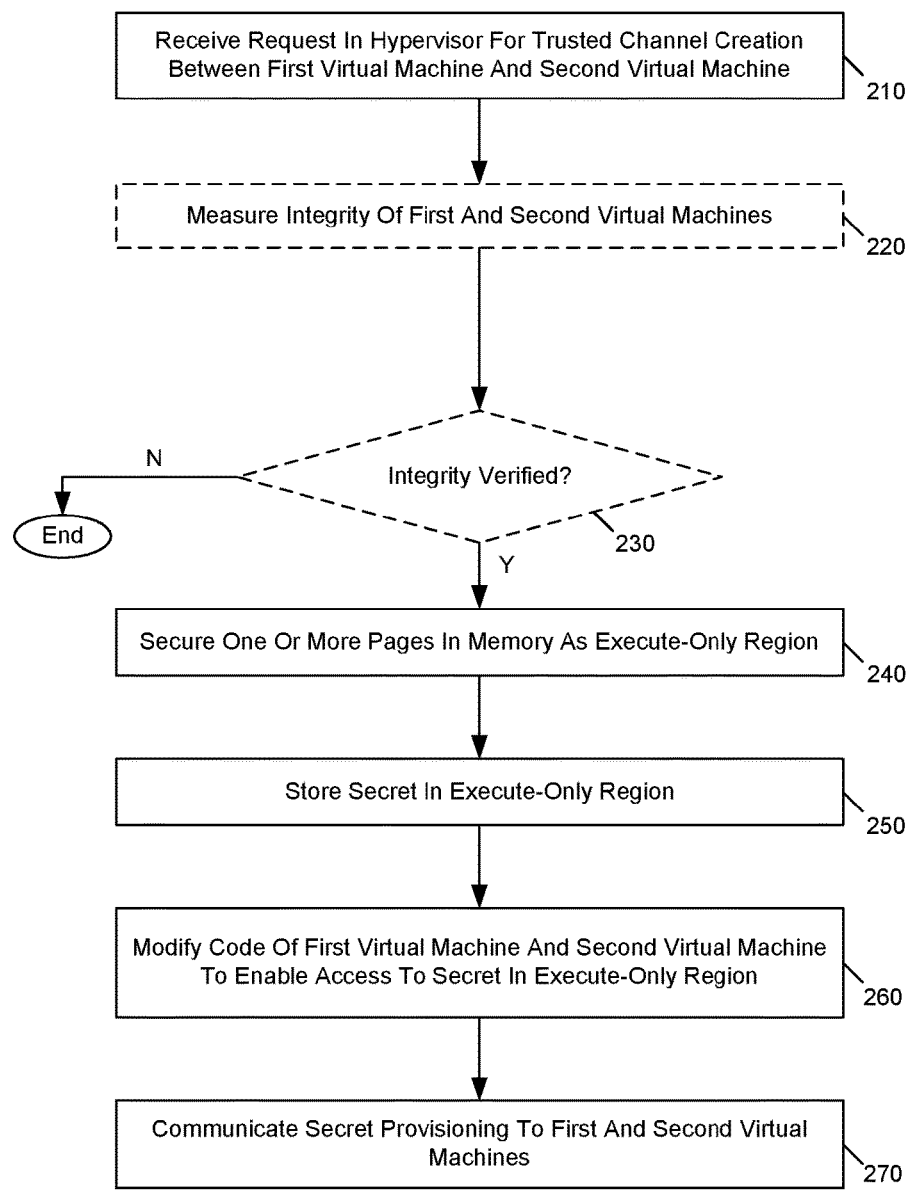
FIG. 2 is a flow diagram of a method in accordance with an embodiment of the present invention.

Referring now to FIG. 2, shown is a flow diagram of a method in accordance with an embodiment of the present invention. More specifically, method 200 shown in FIG. 2 may be performed by supervisor software such as a hypervisor, in combination with hardware and/or firmware. In one example, the hypervisor may execute on one or more general purpose cores of a multicore processor. As illustrated, method 200 begins by receiving a request in the hypervisor (block 210). More specifically, this request is for creation of a trusted channel between two virtual machines (where these virtual machines may be different virtual entities that host one or more OSs and/or one or more applications to execute thereon). Assume that the first virtual machine is associated with a producer application that generates information to be consumed by a consumer application associated with the second virtual machine.

Responsive to this request, the hypervisor may perform optional integrity measurements of the VMs (block 220). For example, a code base of the VMs can be measured and compared against a stored value, e.g., a hash value for the VMs, to ensure that the VMs have not been tampered with or otherwise modified. In such optional embodiments, control next passes to diamond 230 to determine whether integrity of the VMs has been verified. If so, method 200 proceeds, otherwise method 200 may conclude. For example, a message can be sent to the requesting application or other entity to indicate failure due to an integrity violation.

Still with reference to FIG. 2, control next passes to block 240 where one or more pages in memory may be secured as an execute-only region. More specifically, this execute-only (XO) region can be formed of one or more memory pages that are controlled to have XO status. For example, an extended page table (EPT) entry for such one or more pages may have an XO indicator set to indicate that these pages are to be treated as execute-only and thus protection is afforded to these pages. Note in this implementation with multiple communicating VMs, separate spaces within this larger XO region may be allocated to each of the applications.

Thereafter, control passes to block 250 where a secret may be stored in the execute-only region. In one embodiment, a symmetric key can be provided to both VMs by storage of this symmetric key in an execute-only page associated with each of the VMs. Next, control passes to block 260 where code of these VMs can be modified. More specifically, the hypervisor can modify the application code, e.g., via instrumentation, binary translation or so forth to include additional code. In an embodiment, this added code may include a control transfer instruction to enable a jump to enable access to this shared secret and to perform given encryption/decryption operations using this secret. To this end, the modified code may include appropriate encryption and/or decryption code. In some cases encryption and decryption code can be provided to both applications to enable bidirectional communication information between the applications. In other cases, where communication is intended to be only in a single direction, a sender application is provided with encryption code and a receiver application is provided with decryption code.

Still with reference to FIG. 2, after the code is appropriately modified, control passes to block 270 where the hypervisor may communicate the provisioning of the secret to the VMs to thus establish a secure channel between the VMs. Note that from this point forward, the applications can communicate directly via this secure channel without any involvement and/or other interaction with the hypervisor, thus improving communication efficiency and reducing overhead by way of intermediation by such hypervisor. Understand while shown at this high level in the embodiment of FIG. 2, many variations and alternatives are possible.

Figure 3:
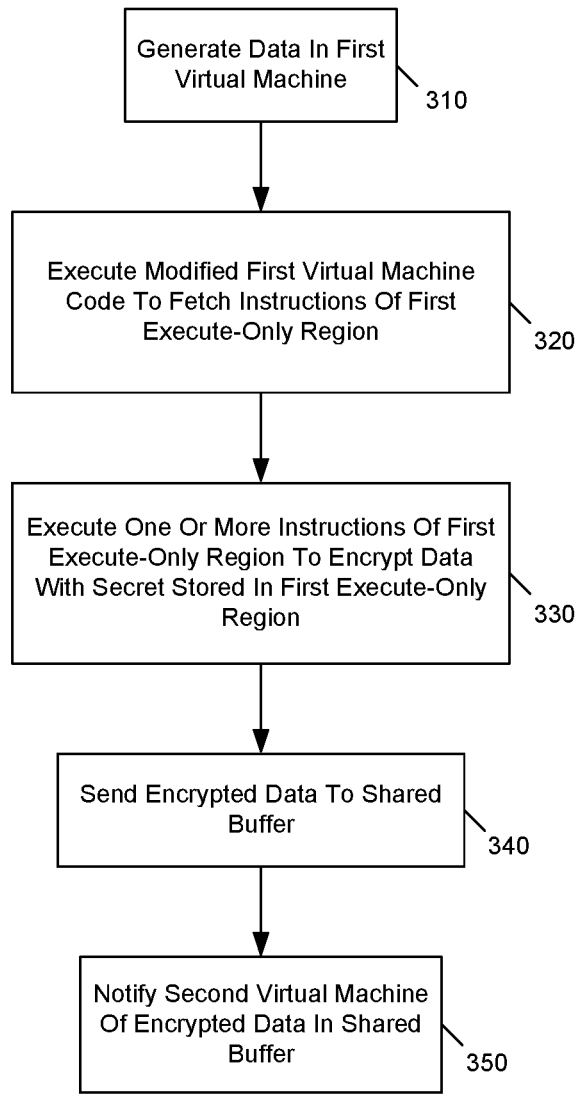
FIG. 3 is a flow diagram of a method in accordance with another embodiment of the present invention.

Referring now to FIG. 3, shown is a flow diagram of a method in accordance with another embodiment of the present invention. More specifically, method 300 of FIG. 3 is a method for encrypting and communicating encrypted information from a first virtual machine to a second virtual machine. As illustrated, method 300 begins by generating data in the first virtual machine (block 310). Understand that many different types of data are possible. For example, in one embodiment the first VM may be a web server application that generates encrypted information such as bank account information or so forth for communication and use by another application.

Next control passes to block 320 where modified code of this first virtual machine may be executed to fetch instructions of the XO region of this VM. For example, the modified VM code may include an added function call, jump or other control transfer operation to enable the first VM to fetch instructions of the first XO region. Next, control passes to block 330 where one or more instructions of this first XO region can be executed to encrypt the data. More specifically, this data encryption may be performed using the secret, also present in the first XO region.

Still with reference to FIG. 3, control next passes to block 340 where the encrypted data may be sent to a shared buffer, which is shared between the two VMs. In an embodiment, a read pointer of the buffer may be used to identify the location at which to store this encrypted data. Thereafter, control passes to block 350 where the second VM can be notified of the presence of this encrypted data in the shared buffer. For example, the first VM may send a message, e.g., via an unsecure channel, to inform the second VM of the presence of this encrypted data in the shared buffer. In other cases, the first VM can send an interrupt or have a receiver poll on the shared buffer to detect new information. Understand while shown at this high level in the embodiment of FIG. 3, many variations and alternatives are possible.

Figure 4:
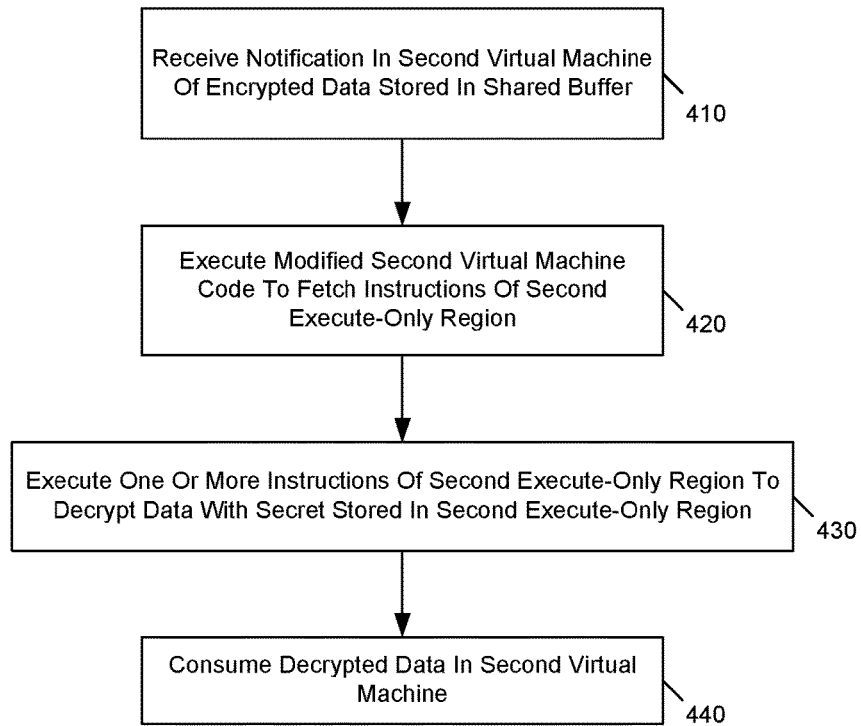
FIG. 4 is a flow diagram of a method in accordance with yet another embodiment of the present invention.

Referring now to FIG. 4, shown is a flow diagram of a method in accordance with yet another embodiment of the present invention. More specifically, method 400 may be executed by the second virtual machine that is to receive and consume this data. As illustrated, method 400 begins by receiving a notification of the encrypted data in the second VM (block 410). This notification may be as discussed above. Thereafter, control passes to block 420 where modified code of the second VM can be executed. This modified code, which may include a function call, jump or other control operation, may be used to fetch instructions of a second XO region that is associated with the second VM.

Still with reference to FIG. 4, control thereafter passes to block 430 where one or more instructions of this second XO region can be executed to decrypt the data. More specifically, the secret also stored in this second XO region may be used to perform the decryption. Thereafter, control passes to block 440, where the second VM may consume the decrypted data. For example, the second VM may use the data or other information in its own processing. Understand while shown at this high level in the embodiment of FIG. 4, many variations and alternatives are possible.

In an embodiment, security for this secret may be realized by restricting access to the secret to a relatively small segment of trusted code, as opposed to allowing access by an entire software application or operating system. In one embodiment, the trusted code may employ a load immediate instruction configured to hold the secret within an immediate operand of the instruction, which can then be loaded into a register upon execution. The load immediate instruction may further be configured to act as a no-operation (NOP) or fault generating instruction when executed outside of a transactional execution mode (also referred to more simply as a "transactional mode"). The load immediate instruction may be contained in an XO memory page, thus preventing a potential adversary from reading (or modifying) the secret. Additionally, the transactional mode may be configured to clear any registers or memory locations that could reveal any information about the secret in the event of a transaction abort.

In some embodiments, a page may be marked execute-only through control of EPTs by a trusted VMM. In some embodiments, other mechanisms may be employed to mark pages as execute-only, for example based on paging, nested paging, linear or physical address range registers or other suitable mechanisms. For example: some device virtualization technologies may be configured by the VMM to block device access to XO pages; memory address segmentation modes may be used to mark linear address ranges as execute-only; and instructions may be added to an ISA to provide the capability to set aside private regions of code and data.

In some embodiments, the secret may be encoded as an immediate operand of one or more load instructions located in an execute-only page. The load instruction may be configured to move the secret, encoded in its immediate operand, to one or more registers of the processor or to any other suitable location. Additional instructions within the execute-only page of the transaction region may also be executed to perform any desired processing operations based on the secret. For example, the secret may be an encryption key and the additional processing may use the key to encrypt or decrypt other data. In embodiments, the formatting and configuration of the load instruction, as well as the use of execute-only pages and transactional execution modes, may prevent unauthorized access to the secret, including attempted adversarial attacks that involve jumping to unintended entrypoints in the code.

In some embodiments, a new load instruction may be defined and implemented for the instruction set architecture (ISA) of a processor or family of processors. The operation code (opcode) of the new instruction may be selected so as not to conflict with existing instruction opcodes. This new instruction, which will be referred to as XMOV herein, may be configured to load the secret encoded in the immediate value (operand of the instruction) into a register of the processor (or other suitable location), e.g., when a transactional mode is active. If the XMOV instruction is executed when the transactional mode is not active, the secret is not loaded. Instead, the XMOV may act as a NOP instruction, or load zeros (or some other constant) or generate an undefined opcode exception. The opcode for the XMOV instruction, as well as any associated modifier and attribute bytes, may be selected to prevent an adversary from learning or inferring anything about the secret by jumping to an unintended entrypoint in the instruction.

In an embodiment, wrapping the processing of the secret in a transaction simplifies the process of clearing out secret data by relying on hardware support to roll back changes during an abort of the transaction. Transactional mode prevents software executing outside of the transaction from viewing memory changes until the transaction commits. Thus, the transaction clears any registers and/or memory locations that may have stored secrets prior to the commit so that those secrets will not be visible outside of the transaction.

Figure 5:
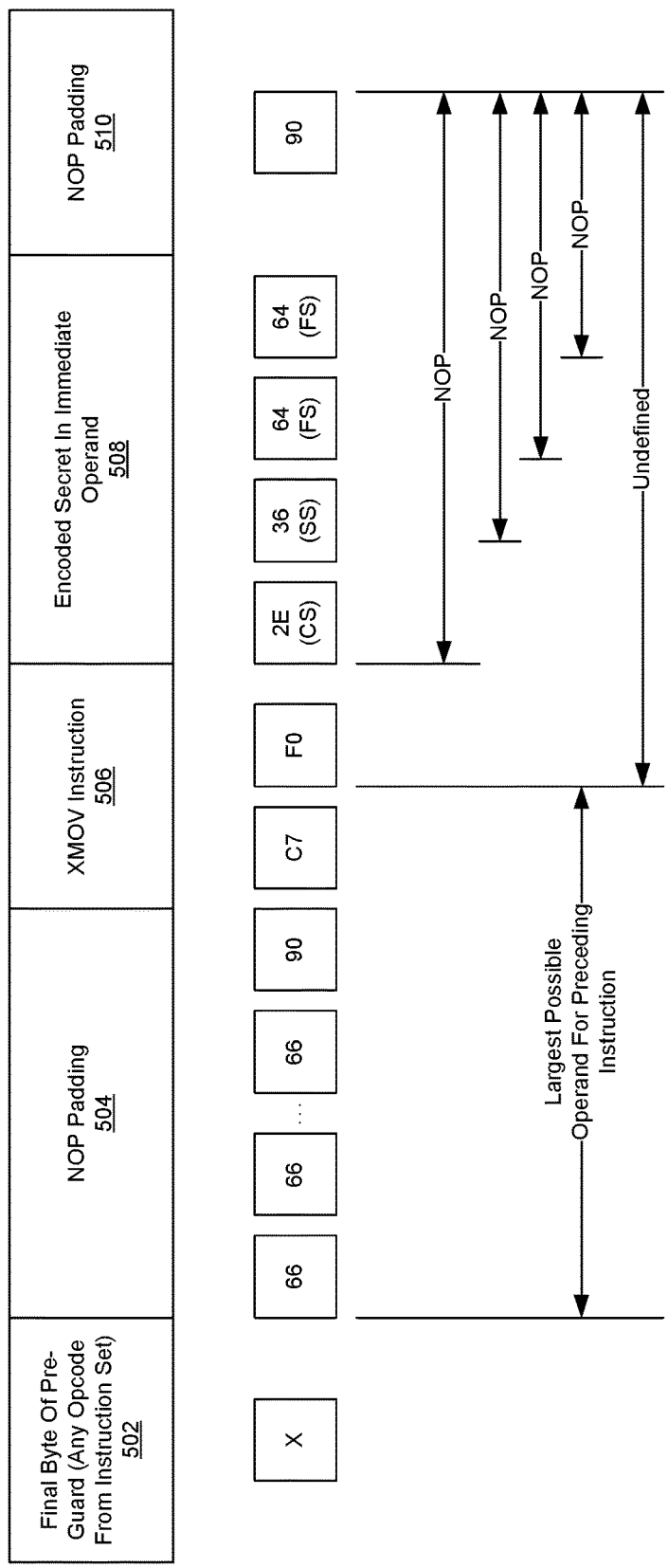
FIG. 5 illustrates an example code sequence in accordance with an embodiment of the present invention.

FIG. 5 illustrates an example code sequence 500 of an embodiment. In some embodiments, the system may be configured to protect against an additional type of adversarial attack based on unintended entrypoints. As described above, the secret will not be loaded by the XMOV instruction 506 if it is reached through an unintended entrypoint. However, if any arbitrary instructions or byte sequences are permitted before the XMOV instruction, an adversary might jump into that byte sequence at a point where the sequence of bytes (starting at that point and possibly extending into the XMOV instruction and secret data) happened to correspond to some valid but unintended instruction of the processor under a particular ISA. Execution of this unintended instruction would generally cause some side effect on the processor, which might be observed and analyzed by the adversary to obtain clues about the secret. For example, the adversary may analyze aspects of the instruction's execution such as timing or effects on architectural state (e.g., registers or metrics visible through performance counters) to obtain clues about the secret.

To prevent this from happening, a NOP padding region 504 may be inserted before the XMOV instruction. The padding is constructed of a series of bytes, the values of which are chosen such that their execution (starting at any point within the sequence) would result in an undefined opcode exception or an ignored NOP under that ISA. During normal execution, from the intended execution point, the NOP padding would act as a NOP that does not interfere with the execution of the XMOV instruction.

In an embodiment, the length of the NOP padding is selected to match the longest possible sequence of operands (in terms of total byte length) that could be associated with the final byte of pre-guard 502, in order to handle the potential situation in which that final byte was interpreted as an opcode reached through an unintended entrypoint jump by the adversary.

The opcode for the XMOV instruction may be chosen such that jumping into an unintended point in the opcode results in an undefined opcode exception or an ignored NOP. Additionally, the secret may also be encoded to achieve this unintended entrypoint protection. For example, in a particular ISA, the length of an immediate operand may be 4 bytes and the choices for each of those bytes may be constrained to 8 possible values that comply with the unintended entrypoint NOP requirements. In such case, the 8 possible values may be mapped to 3 bits of secret data. This would provide for the encoding of 12 bits of secret data in the 4 bytes of the immediate operand 508 of each XMOV instruction 506. Any number of XMOV instructions may thus be pipelined to accommodate the representation of secret data of arbitrary bit length in 12 bit increments. Thus, for example, if the secret data is a 128 bit AES key, eleven XMOV instructions may be used. In some embodiments, additional NOP padding 510 may be inserted after encoded secret 508 to ensure that any sub-portions of the secret cannot be combined with other bytes to create potentially valid instructions.

To further illustrate this instruction pipeline in the context of a particular Intel ISA, byte value sequences are shown (encoded in hexadecimal) for one possible example. In this example, the final byte pre-guard 502 is labeled as an "X" to indicate that it is could be any value. NOP padding 504, which may be up to 6 bytes long to accommodate the largest possible operand size of preceding instruction 502 (in this example ISA), contains values 66, 66, . . . 90 that will be interpreted as a single NOP regardless of the entrypoint within that field. The value 90 represents a single byte NOP instruction, in this ISA, and the value 66 is an instruction prefix that has no effect on the NOP, in this ISA. XMOV instruction 506 is chosen as C7F0 since it is an available (currently unused) opcode in this ISA and satisfies the requirement that jumping to an unintended point in the opcode is undefined or an ignored NOP, in combination with one or more of the immediate operand bytes that are selected from a restricted set of possibilities. In this example, the possible immediate operand bytes are 26, 2E, 36, 3E, 64, 65, 66 and 67 which represent NOP prefixes, in this ISA, for final single byte NOP 510. It may be assumed that these NOP prefixes have execution latencies that are indistinguishable from other NOPs comprising any different combination of the same total number of prefixes, thus preventing analysis of their values based on timing. These 8 possibilities allow for the encoding of 3 bits of secret data in each of the immediate operand bytes. Table 1 represents one example implementation of the secret encoding:

TABLE 1

| Secret Value (binary) | Prefix (Hex) | Prefix (binary) |
|---|---|---|
| 000 | 36 | 0011 0110 |
| 001 | 3E | 0011 1110 |
| 010 | 26 | 0010 0110 |
| 011 | 2E | 0010 1110 |
| 100 | 64 | 0110 0100 |
| 101 | 65 | 0110 0101 |
| 110 | 66 | 0110 0110 |
| 111 | 67 | 0110 0111 |

The encoding defined in Table 1 allows for each 3 bit portion of the secret to be decoded as follows:

Secret={$P6,P4$ xor $P1,P3$ xor $P0$}, where PN is the Nth bit of the prefix (N=0 is least significant bit) and xor is the Exclusive-OR operation, and the commas indicate concatenation of these bits.

In some embodiments, the XMOV instruction may decode the secret immediate values according to a formula such as this and place them into the destination register after shifting the existing contents of the destination register to make space for the new data.

In an alternate embodiment, for example when it is not possible or feasible to define and implement a new instruction such as XMOV, secrets may be protected based on existing transactional support. A page containing a secret is marked execute-only, for example using a trusted VMM to control EPTs or through other known mechanisms. The secret is encoded as an immediate value to one or more MOV RSP instructions (i.e., instructions that load data to a stack pointer register). The immediate values may be configured to include instruction prefixes that are ignored when preceding a NOP instruction. This is to prevent an adversary from learning any part of the secret by jumping directly to some part of the secret, executing the resultant instruction, generating an interrupt to regain control, and then analyzing aspects of the instruction's execution to obtain clues about the secret. It may also prevent an adversary from performing a similar attack by jumping to some byte that is part of the MOV instruction, or prior to the MOV instruction. The resultant unintended instruction may be prevented from revealing anything about the secret by preventing any possible unintended instruction from incorporating any part of the secret. For example, this can be accomplished by preceding each such instruction with a NOP instruction of appropriate length.

Figure 6:
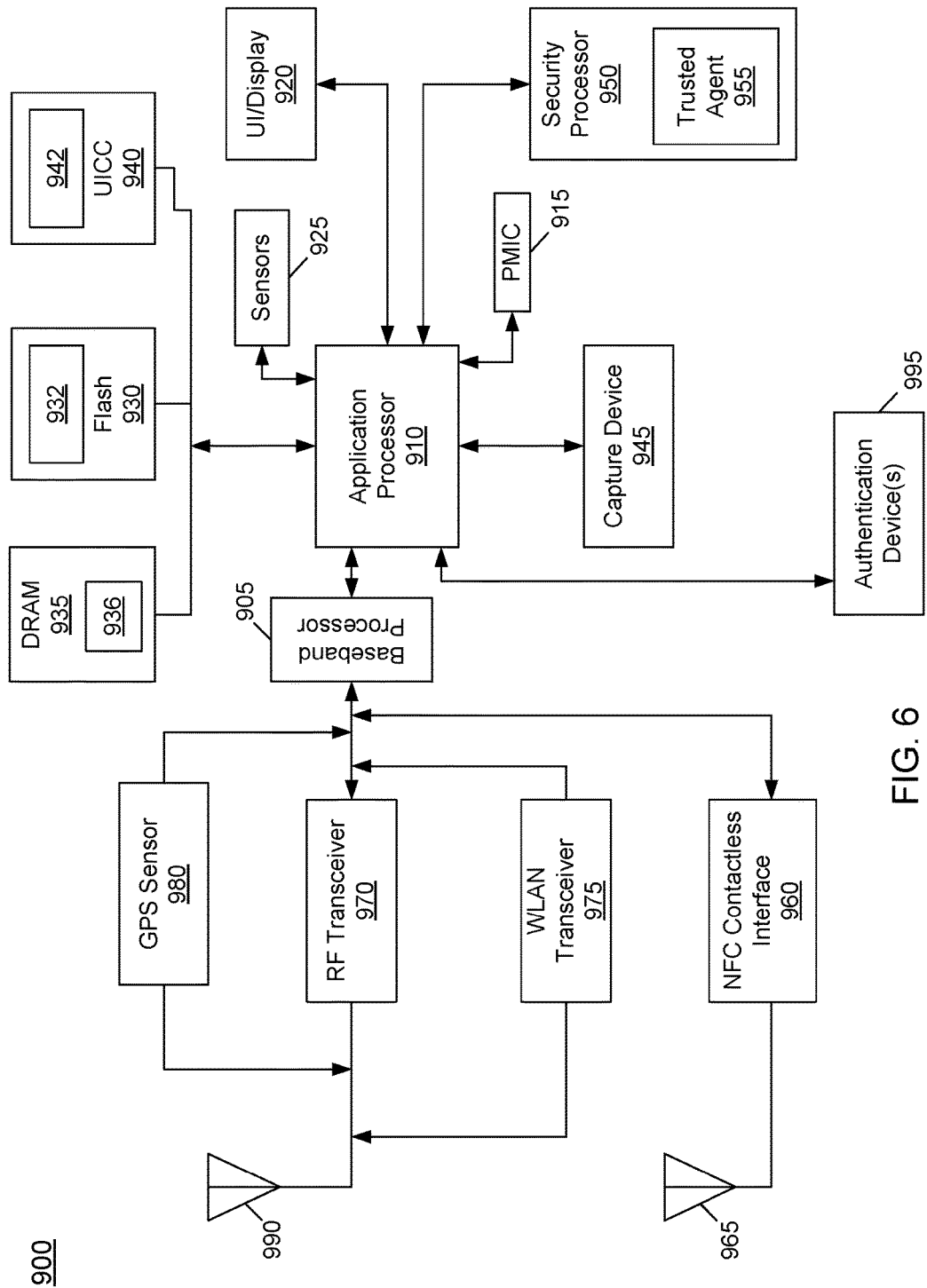
FIG. 6 is a block diagram of an example system with which embodiments can be used.

Referring now to FIG. 6, shown is a block diagram of an example system with which embodiments can be used. As seen, system 900 may be a smartphone or other wireless communicator or any other IoT device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In different embodiments, application processor 910 may include virtualization logic to set up secure channels via provisioning of execute-only code and secrets stored in execute-only memory regions, as described herein. In some embodiments, flash memory 930 and/or DRAM 935 may include a secure portion 932/936 in which secrets and other sensitive information may be stored within one or more execute-only regions. As further seen, application processor 910 also couples to a capture device 945 such as one or more image capture devices that can record video and/or still images.

Still referring to FIG. 6, a universal integrated circuit card (UICC) 940 comprises a subscriber identity module, which in some embodiments includes a secure storage 942 to store secure user information. System 900 may further include a security processor 950 that may implement a TEE, and which may couple to application processor 910. In one embodiment, security processor 950 may include a trusted agent 955 configured to perform the execute-only code and secret provisioning to enable secure channel creation, as described herein.

Furthermore, application processor 910 may implement a secure mode of operation, such as Intel® SGX for hosting of a TEE, which also may perform the secure channel creation described herein. A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 6, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more wireless networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 7:
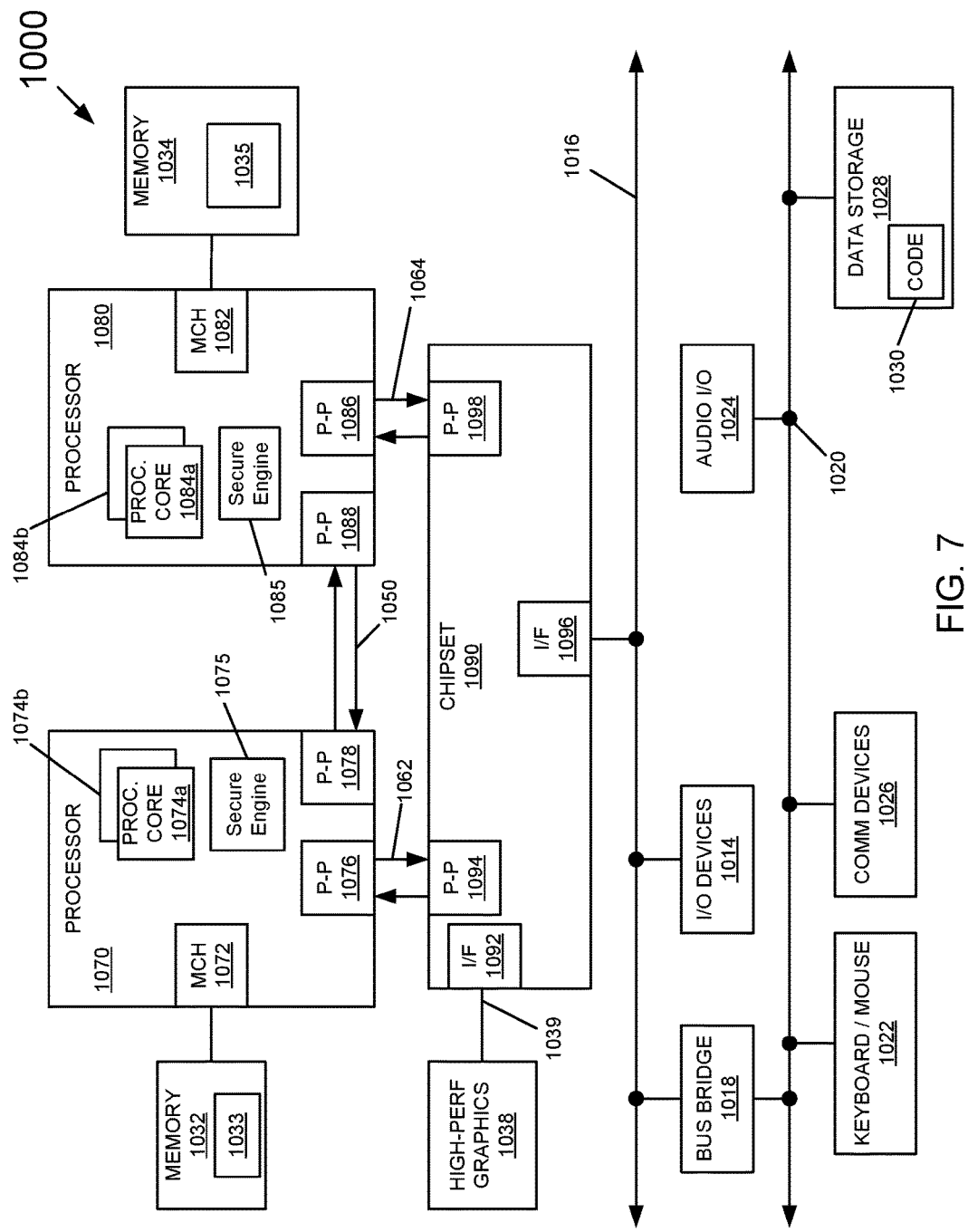
FIG. 7 is a block diagram of a system in accordance with another embodiment of the present invention.

Referring now to FIG. 7, shown is a block diagram of a system in accordance with another embodiment of the present invention. As shown in FIG. 7, multiprocessor system 1000 is a point-to-point interconnect system such as a server system, and includes a first processor 1070 and a second processor 1080 coupled via a point-to-point interconnect 1050. As shown in FIG. 5, each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085 to perform security operations including the secure channel creation via execute-only code and secrets to enable applications to communicate securely in a lightweight manner without further interaction with secure engines 1075, 1085, as described herein.

Still referring to FIG. 7, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 7, MCH's 1072 and 1082 couple the processors to respective memories, namely a memory 1032 and a memory 1034, which may be portions of main memory (e.g., a DRAM) locally attached to the respective processors. As illustrated, memories 1032, 1034 each include one or more execute-only regions 1033, 1035 to be provisioned for use in secure communication between applications. First processor 1070 and second processor 1080 may be coupled to a chipset 1090 via P-P interconnects 1052 and 1054, respectively. As shown in FIG. 7, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 7, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Figure 8:
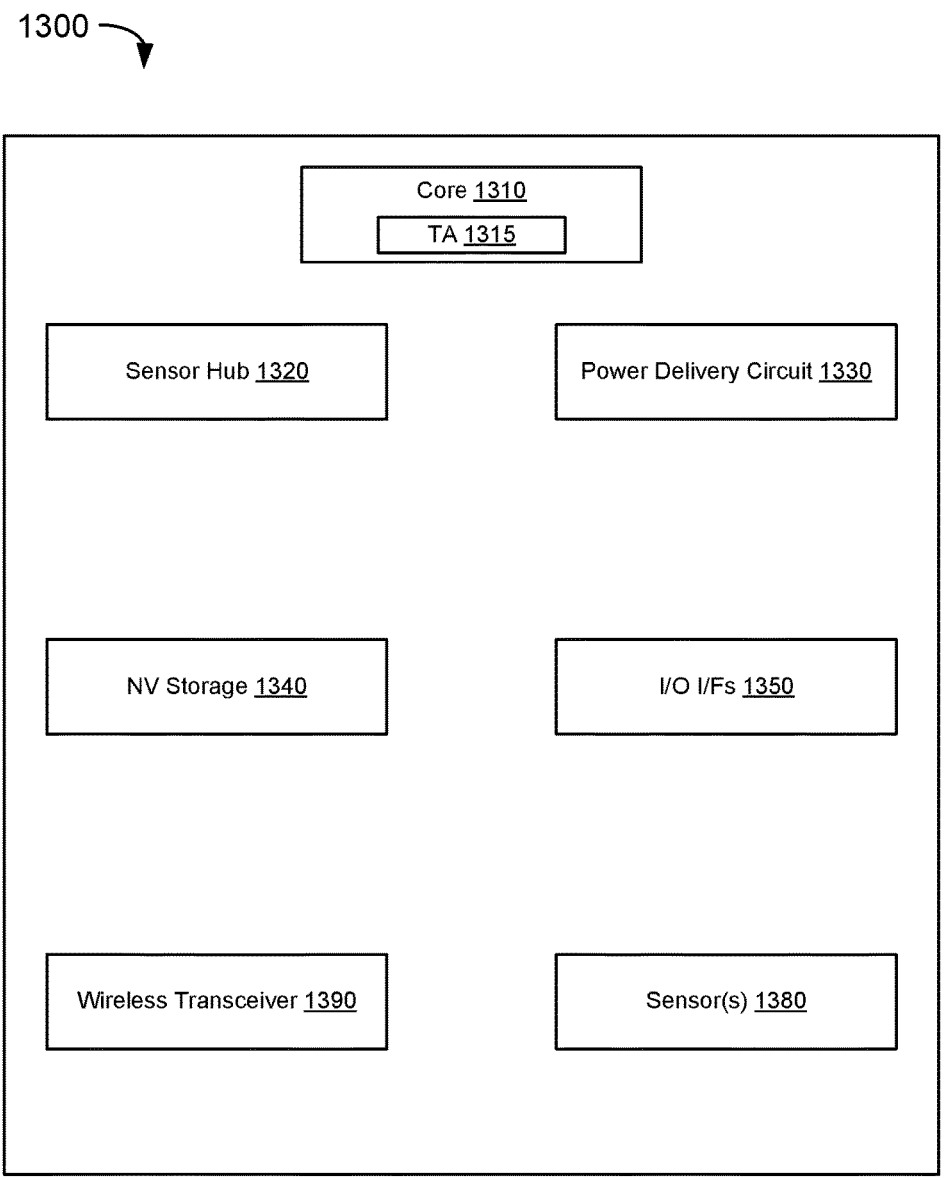
FIG. 8 is a block diagram of a wearable module in accordance with another embodiment.

Embodiments may be used in environments where IoT devices may include wearable devices or other small form factor IoT devices. Referring now to FIG. 8, shown is a block diagram of a wearable module in accordance with another embodiment. In one particular implementation, module 1300 may be an Intel® Curie™ module that includes multiple components adapted within a single small module that can be implemented as all or part of a wearable device. As seen, module 1300 includes a core 1310 (of course in other embodiments more than one core may be present). Such core may be a relatively low complexity in-order core, such as based on an Intel Architecture® Quark™ design. Core 1310 couples to various components including a sensor hub 1320, which may be configured to interact with a plurality of sensors 1380, such as one or more biometric, motion environmental, thermal, and/or other sensors. A power delivery circuit 1330 is present, along with a non-volatile storage 1340. In an embodiment, this circuit may include a rechargeable battery and a recharging circuit, which may in one embodiment receive charging power wirelessly. One or more input/output (IO) interfaces 1350, such as one or more interfaces compatible with one or more of USB/SPI/I²C/GPIO protocols, may be present. In addition, a wireless transceiver 1390, which may be a Bluetooth™ low energy or other short-range wireless transceiver is present to enable wireless communications as described herein.

As further illustrated in FIG. 8, core 1310 may include a trusted agent 1315 as described herein. In some embodiments, this trusted agent may be implemented within general-purpose circuitry of core 1310. In other cases, trusted agent 1315 may be part of a TEE or so forth that may, in some cases, be transparent to an OS that executes on core 1310. Understand that in different implementations a wearable module can take many other forms. By leveraging XO properties, a lightweight trusted channel may be established between two entities, such as by use of a shared secret protected by execute-only code.

The following Examples pertain to further embodiments.

In Example 1, an apparatus includes: a first VM including a data generation logic to generate first information and an encryption logic to encrypt the first information, where the encryption logic includes a first code block stored in a first execute-only region of a memory and the encryption logic is to encrypt the first information with a first key provisioned by a trusted agent, the first key stored in the first code block. The apparatus may further include a second VM including a data consumption logic to consume the first information and a decryption logic to decrypt the encrypted first information. Still further, the apparatus may include a shared buffer to enable secure communication of the encrypted first information from the first VM to the second VM, without involvement of the trusted agent.

In Example 2, the apparatus further comprises the trusted agent to control operation on the first VM and the second VM.

In Example 3, the trusted agent comprises a hypervisor to provide the first code block to the first VM responsive to a request for a trusted channel, the first code block comprising first modified code of a first application of the first VM to enable the first VM to access the first key stored in the first code block.

In Example 4, the decryption logic includes a second code block stored in a second execute-only region of the memory, the second code block comprising second modified code of a second application of the second VM provided by the trusted agent.

In Example 5, the second VM is to decrypt the encrypted first information with the first key provisioned in the second code block by the trusted agent.

In Example 6, the apparatus further comprises an extended page table having a plurality of entries associated with a plurality of pages of the memory, where each of the entries includes an execute-only indicator to indicate whether a corresponding page is of an execute-only region of the memory.

In Example 7, the apparatus further comprises a protection logic to prevent information of the execute-only region from being read.

In Example 8, the first key comprises an address of the shared buffer.

In Example 9, the first VM is to communicate securely with the second VM via the shared buffer in an untrusted environment.

In Example 10, the first VM is to perform packet processing for a virtualized network endpoint.

In Example 11, a method comprises: receiving, in a trusted agent to execute on at least one core of a processor of a system, a request for a first application to create a trusted channel between the first application and a second application; securing at least one first memory page in a memory as a first XO region and associating the first application with the first XO region; securing at least one second memory page in the memory as a second XO region and associating the second application with the second XO region; and storing a shared secret in the first XO region and the second XO region to enable the first application to communicate with the second application via the trusted channel without interaction with the trusted agent.

In Example 12, the method further comprises communicating an indication regarding the shared secret to the first application and the second application.

In Example 13, the method further comprises: modifying code of the first application and storing the modified first application code in the first XO region to enable the first application to access the shared secret; and modifying code of the second application and storing the modified second application code in the second XO region to enable the second application to access the shared secret.

In Example 14, the modified first application code is to enable the first application to encrypt data using the shared secret and write the encrypted data to a shared buffer.

In Example 15, the modified second application code is to enable the second application to read the encrypted data from the shared buffer and decrypt the encrypted data using the shared secret.

In Example 16, the method further comprises measuring an integrity of the first application and the second application.

In Example 17, the method further comprises, when the integrity is not verified, preventing the at least one first memory page from being secured as the first XO region and preventing the at least one second memory page from being secured as the second XO region.

In another Example, a computer readable medium including instructions is to perform the method of any of the above Examples.

In a further Example, a computer readable medium including data is to be used by at least one machine to fabricate at least one integrated circuit to perform the method of any one of the above Examples.

In a still further Example, an apparatus comprises means for performing the method of any one of the above Examples.

In Example 18, a system comprises: a processor including one or more cores to execute a trusted agent, where in response to a request from a first application, the trusted agent is to: create a trusted channel between the first application and a second application; secure at least one first memory page in a system memory as a first XO region and associate the first application with the first XO region; secure at least one second memory page in the system memory as a second XO region and associate the second application with the second XO region; and store a shared secret in the first XO region and the second XO region to enable the first application to communicate with the second application via the trusted channel without interaction with the trusted agent. The system may further include the system memory coupled to the processor, where the system memory is to allocate the first XO region and the second XO region within the system memory.

In Example 19, the system memory further comprises a shared buffer to enable secure communication of encrypted information from the first application to the second application without the interaction with the trusted agent.

In Example 20, the trusted agent is to: modify code of the first application and store the modified first application code in the first XO region to enable the first application to encrypt the information using the shared secret and write the encrypted information to the shared buffer; and modify code of the second application and store the modified second application code in the second XO region to enable the second application to read the encrypted information from the shared buffer and decrypt the encrypted information using the shared secret.

In Example 21, an apparatus comprises: first VM means including a data generation means for generating first information and an encryption means for encrypting the first information, where the encryption means includes a first code block stored in a first execute-only region of a memory, the encryption means to encrypt the first information with a first key provisioned by a trusted agent, the first key stored in the first code block; second VM means including a data consumption means for consuming the first information and a decryption means for decrypting the encrypted first information; and shared buffer means for enabling secure communication of the encrypted first information from the first VM means to the second VM means, without involvement of the trusted agent.

In Example 22, the trusted agent comprises a hypervisor to provide the first code block to the first VM means responsive to a request for a trusted channel, the first code block comprising first modified code of a first application of the first VM means for enabling the first VM means to access the first key stored in the first code block.

In Example 23, the decryption means includes a second code block stored in a second execute-only region of the memory, the second code block comprising second modified code of a second application of the second VM means provided by the trusted agent.

Understand that various combinations of the above Examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a first virtual machine (VM) including a data generation logic to generate first information and an encryption logic to encrypt the first information, wherein the encryption logic includes a first code block stored in a first execute-only region of a memory, the encryption logic to encrypt the first information with a first key provisioned by a trusted agent, the first key stored in the first code block;
a second VM including a data consumption logic to consume the first information and a decryption logic to decrypt the encrypted first information; and
a shared buffer to enable secure communication of the encrypted first information from the first VM to the second VM, without involvement of the trusted agent.

2. The apparatus of claim 1, further comprising the trusted agent to control operation on the first VM and the second VM, wherein the trusted agent comprises a hypervisor, the hypervisor to provide the first code block to the first VM responsive to a request for a trusted channel, the first code block comprising first modified code of a first application of the first VM to enable the first VM to access the first key stored in the first code block.

3. The apparatus of claim 2, wherein the decryption logic includes a second code block stored in a second execute-only region of the memory, the second code block comprising second modified code of a second application of the second VM provided by the trusted agent.

4. The apparatus of claim 3, wherein the second VM is to decrypt the encrypted first information with the first key provisioned in the second code block by the trusted agent.

5. The apparatus of claim 1, further comprising an extended page table having a plurality of entries associated with a plurality of pages of the memory, wherein each of the entries includes an execute-only indicator to indicate whether a corresponding page is of an execute-only region of the memory.

6. The apparatus of claim 1, wherein the first key comprises an address of the shared buffer.

7. The apparatus of claim 1, wherein the first VM is to communicate securely with the second VM via the shared buffer in an untrusted environment.

8. At least one non-transitory computer readable storage medium comprising instructions that when executed enable a system to:
receive, in a trusted agent to execute on at least one core of a processor of the system, a request for a first application to create a trusted channel between the first application and a second application;
secure at least one first memory page in a memory as a first execute-only (XO) region and associate the first application with the first XO region;
secure at least one second memory page in the memory as a second XO region and associate the second application with the second XO region; and
store a shared secret in the first XO region and the second XO region to enable the first application to communicate with the second application via the trusted channel without interaction with the trusted agent.

9. The at least one non-transitory computer readable storage medium of claim 8, further comprising instructions that when executed enable the system to:
modify code of the first application and store the modified first application code in the first XO region to enable the first application to access the shared secret; and modify code of the second application and store the modified second application code in the second XO region to enable the second application to access the shared secret.

10. The at least one non-transitory computer readable storage medium of claim 9, wherein the modified first application code is to enable the first application to encrypt data using the shared secret and write the encrypted data to a shared buffer.

11. The at least one non-transitory computer readable storage medium of claim 10, wherein the modified second application code is to enable the second application to read the encrypted data from the shared buffer and decrypt the encrypted data using the shared secret.

12. A system comprising:
a processor including one or more cores to execute a trusted agent, wherein in response to a request from a first application, the trusted agent is to:
create a trusted channel between the first application and a second application;
secure at least one first memory page in a system memory as a first execute-only (XO) region and associate the first application with the first XO region;
secure at least one second memory page in the system memory as a second XO region and associate the second application with the second XO region; and
store a shared secret in the first XO region and the second XO region to enable the first application to communicate with the second application via the trusted channel without interaction with the trusted agent; and
the system memory coupled to the processor, wherein the system memory is to allocate the first XO region and the second XO region within the system memory.

13. The system of claim 12, wherein the system memory further comprises a shared buffer to enable secure communication of encrypted information from the first application to the second application without the interaction with the trusted agent.

14. The system of claim 13, wherein the trusted agent is to:
modify code of the first application and store the modified first application code in the first XO region to enable the first application to encrypt the information using the shared secret and write the encrypted information to the shared buffer; and
modify code of the second application and store the modified second application code in the second XO region to enable the second application to read the encrypted information from the shared buffer and decrypt the encrypted information using the shared secret.

15. The apparatus of claim 1, wherein the first key is embedded within an instruction of the first execute-only region of the memory.

16. The apparatus of claim 15, wherein the first key is encoded as an immediate operand of the instruction.

17. The apparatus of claim 15, wherein, in response to the instruction, the first VM is to load the first key into a register when a transactional mode is active, and when the transactional mode is not active, to prevent the first key from being loaded.

18. The system of claim 12, wherein the shared secret is embedded within an instruction of the first XO region.

19. The system of claim 18, wherein the shared secret is encoded as an immediate operand of the instruction.

20. The system of claim 18, wherein, in response to the instruction, the first application is to load the shared secret into a register when the processor is in a transactional mode, and otherwise to prevent the shared secret from being loaded.

* * * * *